United States Patent [19]

Lóránt et al.

[11] 4,336,300

[45] Jun. 22, 1982

[54] PROCESS FOR THE PRODUCTION OF WATER VAPOR-PERMEABLE SHEET MATERIALS

[75] Inventors: Iván Lóránt; Imre Csernyánszky; Gyula Murlasits, all of Budapest; Rezsö Rusznyák,

[73] Assignees: Bör-, Mübör-és Cipöipari Kutató Intézet, Budapest; Graboplast Györi Pamutszövö-es Mübörgyár, Györ, both of Hungary

[21] Appl. No.: 144,980

[22] Filed: Apr. 30, 1980

[51] Int. Cl.³ ............... B05D 3/02; B05D 5/00; B32B 5/18; B32B 27/00
[52] U.S. Cl. ............... 428/316.6; 427/244; 427/245; 427/246; 427/373; 427/387; 427/391; 427/411; 428/904; 428/319.3; 264/45.9; 264/129
[58] Field of Search ............... 427/244, 245, 246, 373, 427/387, 391, 411; 428/311, 310, 315, 904

[56] References Cited

U.S. PATENT DOCUMENTS 3,527,653 9/1970 Summer et al. ............ 427/246
4,175,154 11/1979 Faust et al. ............ 427/373 X
4,176,210 11/1979 Skinner ............ 427/373 X Primary Examiner—Michael R. Lusignan
Attorney, Agent, or Firm—Toren, McGeady & Stanger

[57] ABSTRACT

The specification describes water vapor-permeability sheet materials, particularly useful in the footwear industry. The production of sheet materials which are water permeable, highly resistant to wear, water resistant and mechanically stressable occurs by mechanically foaming a polymeric dispersion, the mechanical foaming being carried out in the presence of a surfactant, the density of the film being adjusted by the mechanical foaming to 0.55–0.85 g/cm$^3$, gelling the foamed dispersion at a temperature of 120° to 220° C., for at most 10 minutes, and finishing the sheet material by spraying and/or rastering.

11 Claims, No Drawings

PROCESS FOR THE PRODUCTION OF WATER VAPOR-PERMEABLE SHEET MATERIALS

BACKGROUND OF THE INVENTION

1. Field of the Invention

The invention concerns a process for the production of water vapour-permeable sheet materials, preferably for such materials which are suitable for use in the footwear industry. The invention also concerns a meterial produced by the process and which has improved water-vapour permeability.

2. Description of the Prior Art

It is well-known that the use of synthetic leathers in substitution of natural leathers has grown significantly in order to satisfy increased demands and other trends in development.

It is also known that in the use of synthetic leathers, especially in the footwear industry, the unsatisfactory water-permeability of such materials causes a serious problem.

It is furthermore also known that a key question of the technology of producing synthetic leathers that have been developed in substitution of natural leathers is the problem of ensuring a satisfactory water-vapour permeability for the finished product. Having regard to the fact that in the case of synthetic leathers used in the footwear industry, the chief requirements are good vapour-permeability and water vapour take-up, industrial research in the footwear industry has been directed principally towards and concentrated on seeking to improve these two parameters. It is known that the magnitude of water vapour permeability of synthetic leathers is determined by the construction of the covering layer, that is to say the system comprising a covering film and the finishing film, because the carrier employed in this field, e.g. woven, looped or unwoven carrier, has itself good water vapour permeability characteristics.

Although a very large range of film-forming materials have been used in the synthetic leather industry, in the majority of cases a polyurethane or polyvinylchloride (P.V.C.) material has been used.

Researches conducted with the aim of increasing the water vapour permeability of synthetic upper materials in the footwear industry have led to significant results on the introduction of the so-called aqueous coagulation technology for polyurethane; thus several companies have commenced the manufacture of so-called synthetic uppers covered with porous polyurethane produced by this coagulation method.

The water vapour permeability of such materials can be regarded as better than the characteristics of previously manufactured synthetic uppers but as a consequence of their complicated production technology and of other economic factors, they have not come into widespread use; indeed many companies have now stopped production.

The use of PVC as a film-forming material in the synthetic leather industry goes back a long time and is very widespread because its processing does not require a complicated technology. However, in regard to manufacturing of shoe uppers, only partial results have been achieved by the research aiming to improve water vapour permeability and thus the use of such uppers is restricted.

A satisfactory water vapour permeability for synthetic lining leathers provided with PVC covering layers can be achieved with relatively simple technological measures because the requirements made against such materials, e.g. resistance to repeated bending, physical and mechanical properties etc. are considerably less demanding than those made against uppers for the footwear industry.

The general requirement of ensuring good water vapour permeability in PVC films, may be achieved by numerous methods, but in the footwear industry and more particularly in the manufacture of synthetic leather uppers, relatively few processes are in actual use. One such process is the perforation (Footwear News 30, page 15, 1974) which is perhaps the oldest method still in use for providing suitable permeability properties. Its disadvantages are that the channels formed in the course of perforation may become blocked in use and that, due to the characteristics of the technology, the water resistance of the finished product is not satisfactory, a factor which is very significant consideration for upper materials.

Porous systems are also known which have been produced by sintering PVC. Although such systems have good water vapour permeability, other physical mechanical properties, especially their resistance against repeated bending is unsatisfactory, and consequently in the production technology for synthetic leather uppers the sintering process cannot be used because of these higher demands. (Kalosnikov V.G., Hrustoleva, I.M.: Kozhevenno-Obuvnaya Pvomyshlennosty 20,57—59, 1978).

Another known process involves the use of a salt finely mixed with and dispersed in a PVC plastisol which salt can then be washed out from the film in a technological step following gel formation. In this way a relatively favourably water vapour permeable, continuous channel system is formed, see West German Pat. Nos: 833,805 and 1,444,154 as well as West German published application Nos: 1,111,375.

Furthermore, chemical and mechanical foaming processes are known which are the fundamental and most important methods of making PVC porous and which are also widely used in the manufacture of synthetic leather. In the case of chemical foaming, in dependence upon the choice of the system for softening the PVC and of the blowing agent, the gelled foam may have an open cell system or a closed-cell system or a mixed open and closed cell system. Insofar as the dissociation of the blowing agent and the generation of gas takes place above the gelling temperature, a closed cell system is formed which has practically no water vapour permeability. This technology is used in the manufacture of the traditional PVC-covered synthetic uppers wherein on top of the closed cell foam layer a solid PVC layer is formed which has suitable physical and mechanical properties and provides a suitable aesthetic appearance.

When the blowing agent employed dissociates below the gelling temperature then there results an essentially open-cell construction and the thus obtained product has numerous macropores on its surface which spoil the aesthetic appearance and do not enable the simultaneous achievement of good water vapour permeability and good water resistance; moreover, their resistance against repeated bending does not satisfy higher demands.

A further disadvantage of the chemical foaming technology is that it is very sensitive to local temperature non-uniformities in the gelation tunnel since it follows from the nature of the method that under the effect of temperature differences significant variations in film thickness may arise. A general survey of the chemical foaming processes may be found in the article by Schmidt, P. and Polte A., in Kunststoffe, 57 (1967) pages 25-31 and Visnovsky: "British Plastics," 43, (1970), pages 90-93 and 109-112; SPE Journal, No. 28 (1972) pages 46 048.

Another important method of making PVC porous is the mechanical foaming process. The high pressure technology, such as the Elastomer, Dennis and Trovipor processes are not used in the synthetic leather industry because they are suitable principally for the production of thick layers, in contrast to the unpressurized mechanical methods which are suitable for forming open-pored structures (Sprague, Gr. Rubber and Plastics 34, page 415 (1955); Chemical Engineering 63, page 122, 124, 126 (1956); Modern Plastics 34, (1957) pages 117-118 and 212-213; Kunststoffe, 55 (1965), pages 717-723).

The essence of the mechanical foaming process which does not utilise pressure is that air, or possibly nitrogen, is dispersed in a plastisol containing a suitably selected surfactant (foam stabiliser), then the plastisol foam is spread by a suitable method and the thus obtained film is gelled. Bearing in mind that the foam formation takes place below the gelling temperature, the construction obtained in this way contains almost 100% open cells; local temperature differences in the gelation tunnel cause no significant thickness differences. These advantages of the above described technology have made mechanical foaming processes very attractive for the synthetic leather industry, see Acton J. Debal F.: Kunststoffe 62, (1972) pages 547-557; Schaum Kunststoffe pages 344-352 (1976); as well as West German Pat. Nos: 2,310,017 and 2,437,158.

The thus obtained film structure with open cells and good water vapour permeability has, however, relatively poor physical and mechanical properties; consequently, in hitherto known processes, a so-called wear layer formed mainly from polyurethane is applied to the top of the PVC film. Although on the one hand this measure ensured the achievement of suitable physical and mechanical properties, on the other hand, by its very nature it has significantly decreased the water vapour permeability; consequently, its area of applicability in the footwear industry has been reduced.

SUMMARY OF THE INVENTION

An aim of the present invention is to provide a process by means of which synthetic leather may be produced which is suitable for the footwear industry, especially for the manufacture of shoe uppers. A synthetic leather produced in this way will satisfy this aim if it has good water vapour permeability, has good mechanical properties and in addition, bending and frictional wear tests lead to good results while satisfying water resistance requirements.

The invention is based on the discovery that the above aims can be satisfied by the production of a synthetic leather utilising a mechanical foaming process wherein in the course of foaming, the density of the plastisol foam is adjusted to a value higher than 0.4-0.5 g/cm$^3$ and then in the course of gelling, collapse of the foam is prevented.

Accordingly, the invention provides a process for the production of water vapour permeability sheet materials for use in the footwear industry, wherein polymer dispersions are mechanically foamed in the presence of a surfactant to produce interconnected pores, the density of the film is adjusted to 0.55-0.88 g/cm$^3$, expediently to 0.75 g/cm$^3$, then the film is united with a carrier, whereafter the thus obtained system is gelled at 120°-200° C., expediently at 170° C., over a period of at most 10 minutes, expediently 3 minutes, until an open-cell structure is formed.

DESCRIPTION OF THE PREFERRED EMBODIMENTS

In a preferred embodiment of the process, the film-forming material is PVC and/or vinyl chloride-vinylacetatecopolymer which is/are dispersed in the softening agent. In the course of the process, before foaming, surfactant material is added to the plastisol serving as the basic material of the film, the amount of the surfactant being based on 100 parts by weight of PVC powder, 0.1-12 parts by weight, expediently 5 or 6 parts by weight of silicone, (for example, DC 1251), and they are mixed together.

In a preferred embodiment of carrying out the remainder of the process, in the course of finishing, the product the finishing material, expediently a polyurethane solution, is applied by spraying and/or rastering in the amount of not more than 7 g/cm$^2$ per layer, expediently 3 g/cm$^2$, to the surface of the open-pored sheet material, and each layer is dried before the application of a further layer.

Purely by way of illustration and not of limitation, the invention is further described with the aid of the following Examples.

EXAMPLE 1

With the use of a vinylchloride homopolymer a PVC paste of the following composition is prepared:

| Ingredients | Parts by weight |
| --- | --- |
| Vinylchloride homopolymer (K value = 70) | 100 |
| Dioctyl phthalate | 52.5 |
| Benzyl-butyl-phthalate | 17.5 |
| Stabiliser | 2 |
| Pigment paste (2 parts by weight pigment 4 parts by weight softener) | 6 |
| Silicone foam stabiliser | 6 |

The foaming of the PVC is effected in a Eur-O-Matic Model T apparatus with the following operational parameters:

| | |
| --- | --- |
| Entry pressure of air: | 6.86 × 10$^5$ Pa |
| System pressure: | 1.96 × 10$^5$ Pa |
| Air supply rate: | 14 l/h |
| Plastisol supply rate: | 15 kg/h |
| Rotor r.p.m. | 400 |
| Length of the discharge tube: | 4 meters |
| Diameter of the discharge pipe: | 1.77 centimeters |
| Density of the plastisol foam: | 0.55 g/cm$^3$ |

The plastisol foam is applied in a thickness of 0.4 mm onto a temporary release paper carrier by smearing with a steel counter-roller and then an unwoven carrier is laminated into the plastisol foam film, which carrier has a thickness of 0.9 mm and has a filament composition of 50% polyamide, 40% polyester and 10% viscose impregnated with a nitrile rubber latex.

The gelling is carried out for 3 minutes at 170° C. and then after the product has passed through the cooling rollers, it is separated from the temporary carrier and wound up in a roll.

The thus produced open pored PVC film-covered product has the following properties:

| Water vapour permeability: | 3.20 mg/cm$^3$-hour |
|---|---|
| Resistance to Bally-type repeated bending at 100 kC | Grade C |
| Resistance against frictional wear: | Grade 3 |

From these properties it can be ascertained that despite the excellent water vapour permeability the product is not suitable for use as a shoe upper because of its poor friction wear resistance caused by the density pre-set to a low value but when provided with a finishing film, the material is very suitable as a material for other shoe components.

EXAMPLE 2

The PVC plastisol used in Example 1 is foamed with the following parameters:

| Entry pressure of air: | 6.86 × 10$^5$ Pa |
|---|---|
| System pressure: | 1.96 × 10$^6$ Pa |
| Air supply rate: | 7 liters per hour |
| Plastisol supply rate: | 15 kg per hour |
| Rotor r.p.m.: | 400 |
| Length of discharge pipe: | 4 meters |
| Diameter of discharge pipe: | 1.77 cm |
| Density of the plastisol foam: | 0.75 g/cm$^3$ |

The parameters of the technology for covering with a finishing layer and gelling are the same as were described in Example 1.

The product provided with an open-pored PVC covering layer had the following properties:

| Water vapour permeability: | 1.90 mg/cm$^3$-hour |
|---|---|
| Resistance to Bally-type repeated bending at 100 kC | Grade D |
| Resistance to friction wear: | Grade 4 |

By increasing the volume weight of the plastisol foam and the accordingly covering film, the water vapour permeability value descreased from 3.20 mg/cm$^3$-hour to 1.90 mg/cm$^3$-hour but the frictional wear characterising the mechanical strength of the film has improved by one grade which makes it possible to use this material, when provided with a finishing film, over a wide area of application in the footwear industry.

EXAMPLE 3

A PVC plastisol of the following composition was prepared by using the vinylchloride homopolymer used in Example 1:

| Ingredients | Parts by Weight |
|---|---|
| Vinyl chloride homopolymer (K value = 70) | 100 |
| Dioctyl phthalate | 45 |
| Benzyl-butyl phthalate | 15 |
| Stabiliser | 2 |
| Pigment paste (2 parts by weight pigment 4 parts by weight softener) | 6 |
| Silicone foam stabiliser | 6 |

The foaming of the PVC plastisol was carried out on a EUro-O-Matic Model T apparatus with the parameters described in Example 2.

The lamination and gelling parameters were the same as were described in Example 1.

The product covered with an open-pored PVC film had the following properties:

| Water vapour permeability: | 1.85 mg/cm$^3$-hour |
|---|---|
| Resistance to Bally-type repeated bending at 100 kC | Grade D |
| Resistance to frictional wear: | Grade 4 |

On the basis of these measurement results, after finishing the material is highly suitable for use as a shoe upper.

EXAMPLE 4

By utilising the vinylchloride homopolymer used in Example 1, a PVC plastisol of the following composition was prepared.

| Ingredients | Parts by weight |
|---|---|
| Vinylchloride homopolymer | 100 |
| Dioctyl phthalate | 70 |
| Stabiliser | 2 |
| Pigment paste (2 parts by weight pigment 4 parts by weight softener) | 6 |
| Silicone foam stabilisers | 6 |

The foaming of the PVC plastisol was carried out with the parameters described in Example 2, while the lamination and gelling conditions were identical with those described in Example.

The product covered with an open-pored PVC film had the following properties.

| Water vapour permeability: | 2.80 mg/cm$^3$-hour |
|---|---|
| Resistance to Bally-type bending at 100 kC | Grade D |
| Resistance to frictional wear: | Grade 4 |

On the basis of these measurement results, when the product is provided with a finishing film, it may be used as a shoe upper of good water vapour permeability.

EXAMPLE 5

The finishing of the product described in Example 2, an open-cell PVC foam-covered product, was carried out as follows.

For the finishing a polyurethane solution diluted with isopropyl-alcohol-toluene mixture was used and the application was carried out with a raster cylinder of a fineness value of 32.

When a multilayer finish is applied, then each film is dried at 100° C. before applying the next layer.

In the Table below, the properties examined are shown as a function of the number of layers applied.

| Number of Layers applied | Water vapour permeability mg/cm$^2$-hour | Resistance Grade Bally-type bending at 100 kC | Grade of resistance against frictional wear |
|---|---|---|---|
| 0 | 1.90 | D | 4 |
| 1 | 1.24 | D | 4 |

-continued

| Number of Layers applied | Water vapour permeability mg/cm²-hour | Resistance Grade Bally-type bending at 100 kC | Grade of resistance against frictional wear |
| --- | --- | --- | --- |
| 2 | 1.19 | D | 4 |
| 3 | 1.00 | D | 4 |

By a correct choice of finishing material, after application of two layers, a dry surface of good touch can be obtained. On the basis of the measurements the synthetic leather upper provided with a covering layer incorporating the open-pored PVC film and the non-continuous polyurethane finishing film meets the demands made on the shoe uppers in the footwear industry and meets also or achieves the aims of the invention.

EXAMPLE 6

The open-pored PVC film-covered product described in Example 2 is finished as follows.

The polyurethane solution described in Example 5 was used for the finishing but in such a way that the first layer was applied by spraying while the additional layers were applied by means of a raster cylinder of fineness value 50.

In the individual phases of the finishing process, the measured characteristics of the product were as follows:

| Phase of the finishing process | W.V.P. mg/cm³-hour | Resistance grade at 100 kC to Bally-type repeated bending | Resistance grade to frictional wear |
| --- | --- | --- | --- |
| Without finishing | 1.90 | D | 4 |
| Finished by spraying | 1.67 | D | 4 |
| Finished by spraying + lacquered once with a raster cylinder | 1.32 | D | 4 |
| Finished by spraying + lacquered twice with a raster cylinder | 1.20 | D | 4 |

The data from the above Table prove that by forming a non-continuous finishing layer on the surface, the products with the open-pored PVC film possess suitable water vapour permeability characteristics, even after multiple applications of lacquers.

Our experiments have proved that it is necessary to adjust the volume weight of the PVC plastisol foam to a value higher than the conventional 0.4–0.5 g/cm³, namely to 0.55–0.85 g/cm³, preferably to 0.75 g/cm³, which still ensures good water vapour permeability. At the same time, the physical and mechanical properties are considerably improved. Taking these requirements into account, the finishing of the product should be achieved in such a way that the openness of the surface should not be decreased significantly and the structure of good hygienic properties should not be damaged. The finishing may be carried out by a single application or by multiple applications, by spraying or by the use of raster cylinders and the applied quantity of initial material may be 1–7 g/cm² per layer. The preferred plastisols are PVC powder emulsions of K=70; products produced by a microsuspension process; or vinyl-chloride-cinyl-acetate copolymers.

The choice of softener or softening system is principally a function of the properties demanded of the finished product and accordingly they may be primarily phthalates, sebacates, azelates, or polymeric softeners, with 50–100 parts by weight expediently 70 parts by weight, of softener for 100 parts by weight of PVC powder. (Dioctylphthalate, benzyl butylphthalate, dioctylsebac, dioctyl azelate etc.)

For heat and light stabiliser, it is preferred to use a liquid Ba-Cd-Zn complex stabiliser.

For the foaming of PVC plastisols, special surfactants are required which may be anion-active, cation-active, non-ionic and preferably silicone-based products. In the process according to the invention, the use of silicones is necessary because without them the water resistance requirements made against synthetic upper materials could not be met with a covering layer which even after finishing contains open surface pores. The amount of silicone used is expediently 0.1–12 parts by weight, expediently 6 parts by weight, based on 100 parts by weight of PVC powder, in the interests of ensuring good foaming properties and good water resistance.

Expediently, a DC 1251 silicone is used.

The preparation of the PVC plastisol takes place in the conventional manner and the surface-active material required for the foaming is mixed into the prepared paste under slow stirring. For foaming the plastisol, a continuously operating foaming apparatus is required (e.g. Eur-O-Matic, Oskes, Texacote, Amdes foam mixers) which in the case of steady paste and air feed ensures the achievement of the required volume weight and uniformity with time. By a suitable choice of the PVC-softening material and surfactant material a very fine cream-like foam can be produced which can be applied to a suitable carrier by direct or indirect smearing technology. The gellification of the PVC plastisol foam is carried out at 120°–200° C., expediently at 170° C., for 1–10 minutes, expediently 3 minutes, to ensure that the foam structure advantageous from the point of water vapour permeability is maintained, that is to say, the film should not receive excessive heat load to prevent surface melting and collapse of the foam.

The product covered with an open-pored PVC layer can be finished with a polyurethane lacquer containing a single-component solvent or a two-component solvent, by spraying or application via a raster cylinder, in one or several steps. In the event of several applications or steps, it is necessary first to dry the previous layer. The total amount of finishing product applied will greatly depend on the properties of such material but in general should not exceed 15 g/cm². What is important is that it should not form a closing layer on the surface of the PVC film, that is to say it should not completely close the surface pores because in that case the water vapour permeability would be very considerably decreased.

The above-described process opens up the possibility of manufacturing a synthetic leather for use as an upper in the footwear industry the water vapour permeability which is above 1 mg/cm²-hour measured at 20° C., the resistance to Bally-type repeated bending at 100 kC being no worse than grade D and which has a resistance against friction wear of at least Grade 4.

We claim:

1. A process for the production of sheet materials which are water permeable, highly resistant to wear, water resistant and mechanically stressable comprising mechanically foaming a dispersion of polymers selected from the group consisting of PVC and vinyl chloride-vinyl acetate copolymers dispersed in a softener, in the presence of a surfactant, adjusting the density of the foam by the mechanical foaming to 0.55–0.85 g/cm$^3$, gelling the foamed dispersion at a temperature of 120° to 220° C. for at most 10 minutes, and finishing the sheet material by spraying and rastering.

2. A process as claimed in claim 1 wherein the density of the foam is adjusted to about 0.75 g/cm$^3$ during mechanical foaming.

3. A process of claim 1 wherein the foamed dispersion is gelled at a temperature of about 170° C.

4. A process as claimed in claim 1 wherein the gelling of the foam takes place for about 3 minutes.

5. A process as claimed in claim 1 wherein before foaming 0.1–12 parts by weight silicone is added to the film-forming polymeric dispersion for every 100 parts by weight polymeric dispersion.

6. A process as claimed in claim 5 wherein about 6 parts by weight silicone is added to the film-forming plastisol for every 100 parts by weight of polymeric dispersion.

7. The process of claim 1 or 5 wherein at the finishing stage, up to 7 g/cm$^2$ per layer, of finishing material, is applied to an open-pored sheet material by spraying and/or rastering and the finishing material is dried layer by layer.

8. A process as claimed in claim 7 wherein about 3 g/cm$^2$ of finishing material is applied to the open pore sheet.

9. A process as claimed in claim 7 wherein the finishing material is a polyurethane solution.

10. A water vapor permeable sheet prepared by the process of claim 1.

11. A water vapor permeable sheet prepared by the process of claim 7.

* * * * *

UNITED STATES PATENT OFFICE
CERTIFICATE OF CORRECTION

Patent No. 4,336,300          Dated June 22, 1982

Inventor(s) Ivan Lorant, et al

It is certified that error appears in the above-identified patent and that said Letters Patent are hereby corrected as shown below:

[75]     Iván Lóránt; Imre Csernyanszky;
          Gyula Murlasits, all of Budapest; Hungary,
          Rezső Rusznyák; Paula Szabó née Paulyuk
          both of Győr; Hungary.

*Signed and Sealed this*

*Twenty-fourth* Day of *August 1982*

|SEAL|

*Attest:*

GERALD J. MOSSINGHOFF

*Attesting Officer*     *Commissioner of Patents and Trademarks*